(No Model.) 5 Sheets—Sheet 3.

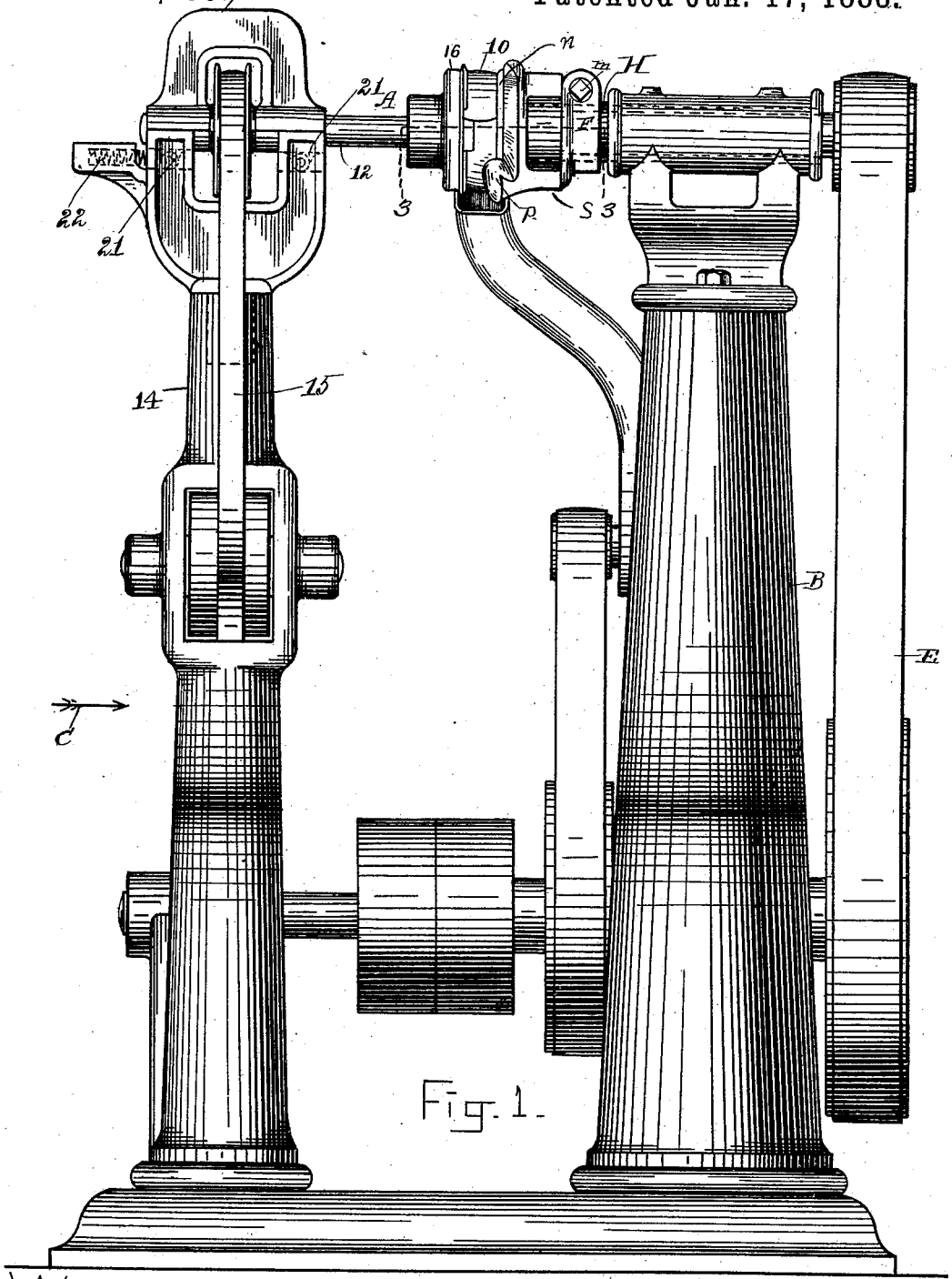

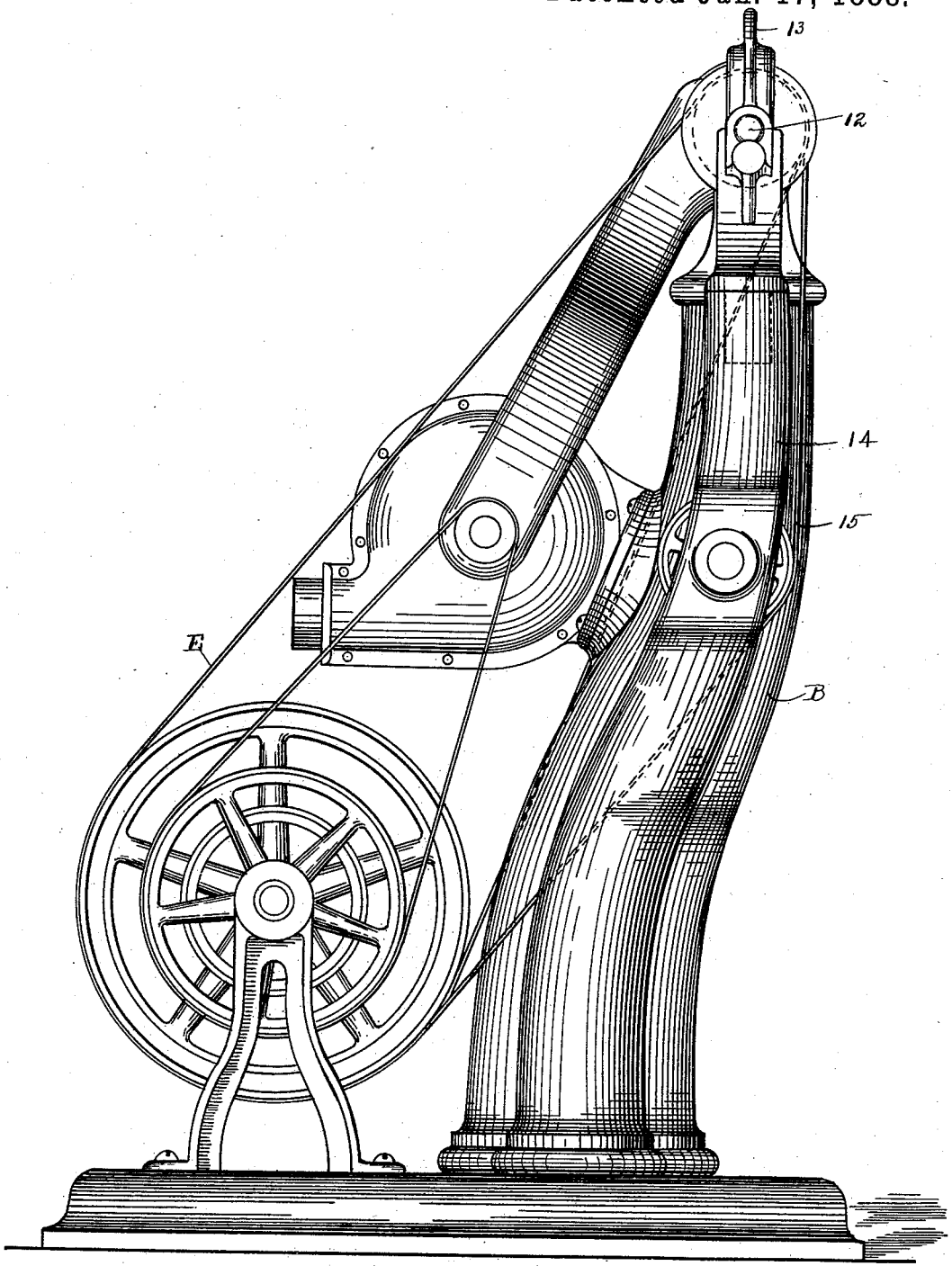

F. N. ETHRIDGE.
HEEL TRIMMING MACHINE.

No. 376,433. Patented Jan. 17, 1888.

Witnesses:
Evelyn E. Hamill
A. J. Mosher

Inventor.
Frank N. Ethridge
By C. B. Tuttle
Att'y (No Model.) 5 Sheets—Sheet 4.

F. N. ETHRIDGE.
HEEL TRIMMING MACHINE.

No. 376,433. Patented Jan. 17, 1888.

WITNESSES.
Evelyn E. Hamill
N. J. Mosher

INVENTOR.
Frank N. Ethridge
By C. B. Tuttle
Att'y (No Model.)　　　　　　　　　　　　　　　　　　　　5 Sheets—Sheet 5.

F. N. ETHRIDGE.
HEEL TRIMMING MACHINE.

No. 376,433.　　　　　　　　　Patented Jan. 17, 1888.

WITNESSES:
Evelyn E. Camill
A. J. Mosher

INVENTOR:
Frank N. Ethridge
By
O. B. Tuttle
Att'ys

UNITED STATES PATENT OFFICE.

FRANK N. ETHRIDGE, OF LYNN, MASSACHUSETTS, ASSIGNOR OF ONE-HALF TO JOSEPH M. TAYLOR, OF SAME PLACE.

HEEL-TRIMMING MACHINE.

SPECIFICATION forming part of Letters Patent No. 376,433, dated January 17, 1888.

Application filed July 20, 1887. Serial No. 244,800. (No model.)

*To all whom it may concern:*

Be it known that I, FRANK N. ETHRIDGE, a citizen of the United States, residing at Lynn, in the county of Essex and Commonwealth of Massachusetts, have invented certain Improvements in Heel-Trimming Machines, of which the following, taken in connection with the accompanying drawings, is a specification.

Figure 4:
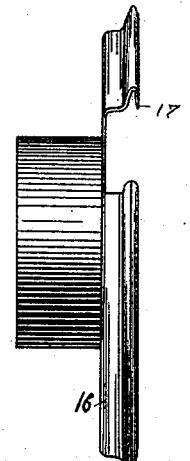
Figure 5:
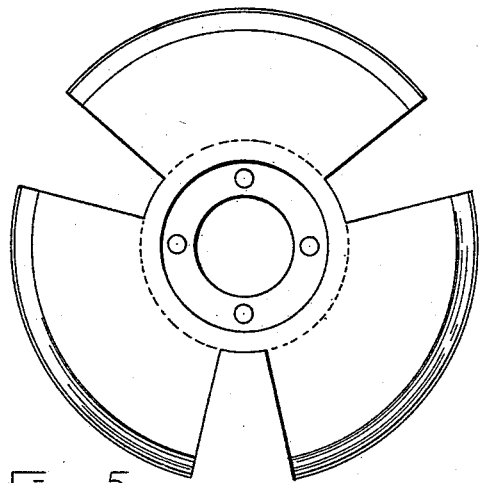
Figure 3:
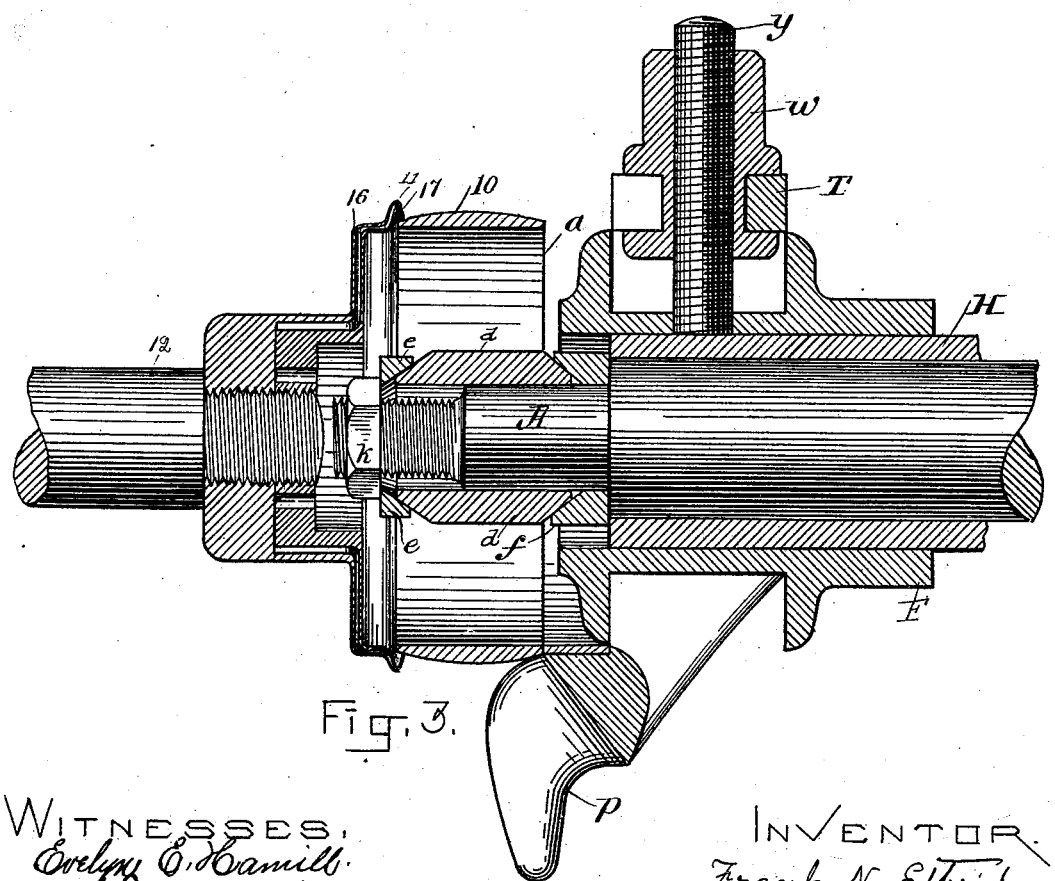

Referring to the drawings, Figure 1 is an elevation of the front part of the machine embodying my invention. Fig. 2 is a similar view of the end of the machine, the line of observation being as indicated by the arrow C. Fig. 3 is the plan of a section on line 3 3, Fig. 1. Fig. 4 is an elevation showing the side of the randing-knife. Fig. 5 is a similar view of the front face of the same. Figs. 6, 7, 8, 9, 10, 11, and 12 are views of certain details to be referred to or described hereinafter.

This invention relates to heel-trimming machines; and the object and nature thereof will be fully described, and then specifically claimed hereinafter.

Figure 10:
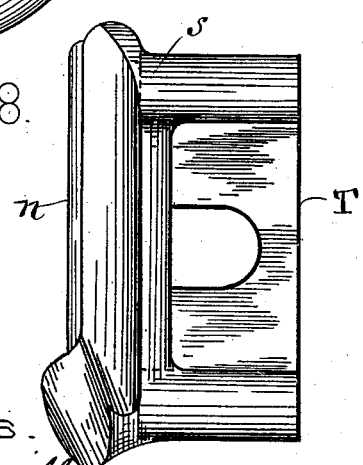
Figure 11:
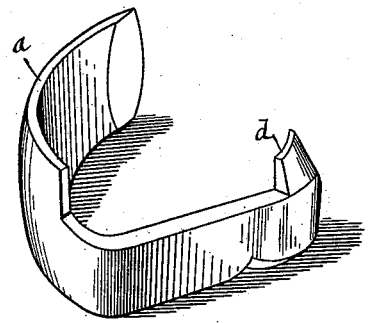
Figure 12:
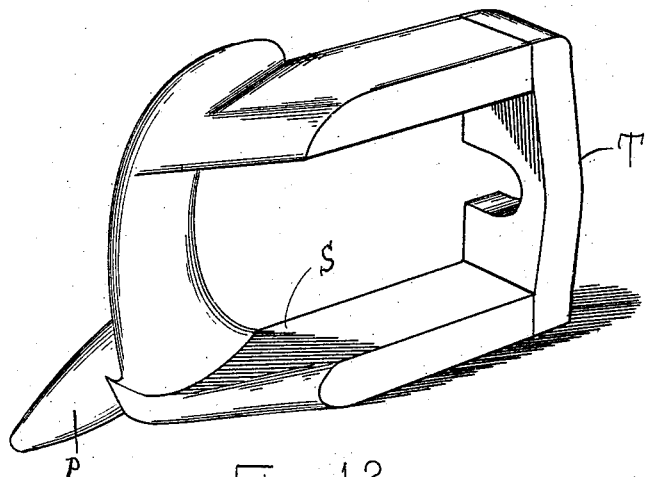

Fig. 10 is a perspective view representing one of the trimming-knives detached. The special formation of the knife may be readily ascertained by inspecting this view of the drawings. Three of said knives are employed to form the trimming-tool or cutter-head, and Fig. 7 of the drawings represents the three knives assembled together.

Figure 6:
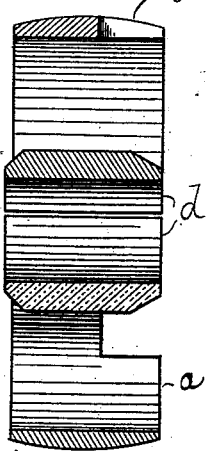
Figure 7:
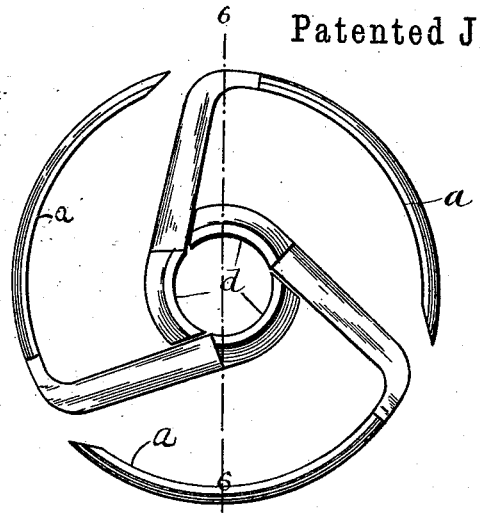

Fig. 6 is a section of the assembled cutter on line 6 6 of Fig. 7.

In the machine three knives are assembled about the rotating shaft A, as shown in Fig. 3. The curved faces $d$ (see Fig. 7) of the knife-shanks are permitted to bear upon the shaft, (see Fig. 3,) and the knives are securely bound upon the shaft A by means of the nut $k$ and intermediate clamping-collars, $e$ $e$. To this end the collars and knife-shanks have their contiguous faces beveled, as shown in Fig. 3. Said shaft A is suitably journaled in the column B, and is revolved by means of belt E, Fig. 1.

Figure 8:
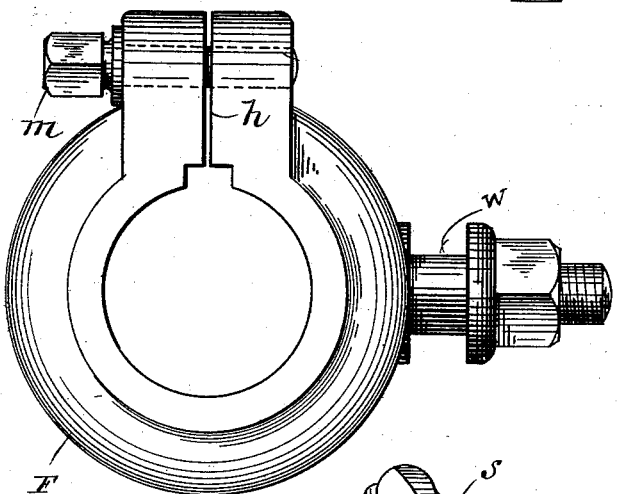
Figure 9:
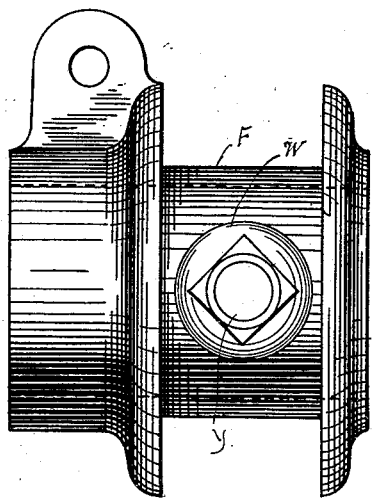

Fig. 8 of the drawings is an end elevation of a flanged collar, F, and Fig. 9 is a side elevation of the same. Said collar has a central bore to receive the sleeve H, which is an extension from the standard B. The collar is divided at the point $h$, and is provided with a bolt, $m$, to the end that it may be clamped firmly to the sleeve H. The collar, when not tightened by the bolt, is permitted endwise movement on the supporting-sleeve H, to the end that it may be moved toward and from the cutter-head. This arrangement allows knives of different width to be used in forming the cutter-head without interfering with the collar. To prevent the collar from turning on the sleeve H when loosened, I employ an ordinary spline or key. (Not shown.) The heel-rest P and guard $n$ are supported by the collar F, and the endwise movement of the collar operates to bring the said rest and guard up to or away from the cutters, and the desired position of these parts relative to the cutters having been attained, the whole may be secured by simply clamping the collar, as before described. To this end the guard $n$ and the heel-rest P are made in one piece; or, if in separate pieces, they are firmly secured together. They are further provided with a yoke, S, (see Fig. 12,) to the end that they may be readily combined with the collar F, and also permit adjustment thereon in a direction at right angles to the axis of the collar. The combination with the collar is effected by removing the clip T and passing the yoke over the collar and again affixing the clip. Said clip is provided with an opening to receive the flanged nut $w$, as shown, and the nut is threaded to turn on the screw-stud $y$. The stud is fixed securely in the collar F, and consequently the turn of the nut will cause the yoke to move on the collar F in a direction at right angles to the axis of the collar or supporting-sleeve H. By this mechanism the guard $n$ and rest P may by an appropriate turn of the nut $w$ be moved toward and from the shaft A and adjusted to the varying sizes of the different cutter-heads which may from time to time be used. It will be understood that the yoke S is prevented by the stud $y$ from turning on the collar, and is thus maintained in the position to support the heel during the operation of trimming. The faces 10 of the cutting-knives determine the shape to be imparted to the heel by the operation of trimming. To this end the heel is placed upon the heel-rest P and pressed forward to the cutters, which revolve very rapidly and cut away the heel until the top lift or extreme outer edge of the heel bears upon the guard n, whereby the onward movement of the heel is then arrested, and thereupon it is slowly turned about in the usual way and all parts thereof are presented to the action of the cutter. Combined with the cutter-head is a rand-cutter, 11. This cutter is represented in detail by Figs. 4 and 5 of the drawings, Fig. 4 being a side elevation and Fig. 5 a face elevation thereof. Said rand-cutter is secured to the end of shaft 12, which shaft is journaled in a head-block, 13, which in turn is supported by a column, 14. A belt, 15, imparts motion to the shaft 12, causing the rand-cutter to travel in time, direction, and speed uniformly with the trimmer-head.

It is the purpose of the rand-cutter to travel in the rand-crease and trim the edge of the heel-seat. To this end it is provided with a guard or shield, 16, that bears against the shoe-upper and protects it from being injured by the sharp edges of the rand-cutter. The cutting-edges 17 of the rand-tool overlap a portion of the cutters a, as shown in Fig. 3, to which purpose the face of the rand-tool is chambered out, so as to receive the end of the cutter-head, as shown. In use the rand-cutter travels in between the heel-seat and the shoe-upper, and it becomes necessary for the rand-cutter in following the curvature of the heel to move toward and away from the trimming-cutter, and to permit this movement the head 13, in which the shaft 12 is journaled, is made in two parts. The upper part is arranged to travel in a suitable groove formed in the bottom part, and it is provided with anti-friction wheels 21, to facilitate and make easy the endwise movement of the shaft. A spring, 22, operates to press the shaft 12 forward with a yielding pressure. It is desirable that the lower edges, 17, of the rand-cutter shall be at all times in close proximity to the surface of the trimmer-cutters at the point or line of contact with the heel. It is important, therefore, that the rand-cutter shall at this point follow the cross-sectional curvature of the cutter-face 10 while passing backward or forward, according to the endwise movement of the shaft 12. To this end the head 13 is provided with a suitable tang or stud fitted to turn in a socket in the top of column 14, and the shaft 12, while moving endwise, also permits a swivel movement that allows the rand-cutter to conform closely to the curvature of the trimmer-faces, and at all times to bear closely upon the cutter-faces along the line of contact with the heel.

In operating this machine the workman takes hold of the shoe and places the heel thereof upon the heel-rest P. He then presses the heel forward, to be cut away by the cutter-surface 10 until the edge of the topmost lift of the heel bears upon the guard n, the rand-cutter being allowed at the same time to enter the rand-crease. The heel is then turned about, and its entire edge-surface is presented to the trimmer-cutters in the usual manner. The rand-cutter meantime yields and conforms automatically to the varying curvature of the heel, and contracts or extends the cutting-surfaces 10 by overlapping more or less thereof. The trimming-surface 10 in this manner is automatically suited to the varying height of the heel.

What I claim as of my invention, and desire by Letters Patent to secure, is—

1. In a heel-trimming machine, the combination of a shaft and means for revolving the same, a trimmer-tool mounted on said shaft, and a heel-rest for supporting the heel, a rand-cutter mounted on an independent shaft in substantially the same axial plane with the cutter-shaft, and independent means for revolving said shaft and rand-cutter in the direction and uniformly with the trimmer-tool, substantially as described.

2. In the heel-trimming machine herein described, the combination of a shaft and means for revolving the shaft, a trimmer-tool mounted on said shaft, and a heel-rest for supporting the heel, a rand-cutter mounted on an independent shaft in the same axial line as the trimmer-shaft and overlapping a portion of the trimmer-tool, and independent means for revolving the rand-cutter uniformly with the trimmer-tool, substantially as described.

3. In a heel-trimming machine, the combination of a shaft and means for revolving the shaft, a trimmer-tool mounted on said shaft, and a heel-rest for supporting the heel, combined with a rand-cutter, said rand-cutter being mounted on an independent shaft in the same axial line as the trimmer-shaft and adapted to permit movement in line with the axis of rotation of the trimmer-tool, and independent means for revolving the rand-cutter uniformly with the trimmer-tool, all substantially as described.

4. In a heel-trimming machine, the combination of a shaft and means for revolving the shaft, a trimmer-tool mounted on said shaft, a heel-rest, P, for supporting the heel, a top-lift guide, n, yoke S, and collar F, said heel-rest and top-lift guide being formed or combined in one piece and adapted to permit adjustment, as described, in a line at right angles to the axis of rotation of the trimmer-tool, substantially as described.

5. The combination, in a heel-trimming machine, of the heel-rest P, top-lift guide n, the yoke S, the flange-supporting collar F, mounted on the sleeve H of the trimmer-shaft, screw-stud y, and flanged nut w, and trimmer-tool, substantially as described.

6. In a heel-trimming machine, the shaft 12, the head 13, and the rand-cutter 17, in combination with the trimmer-tool carried on an independent shaft, substantially as described.

7. In a heel-trimming machine, the shaft 12, the divided head 13, the spring-cutter 22, the rand-cutter 17, and means for revolving the cutter 17, in combination with the heel-trimming-tool mounted upon an independent shaft, substantially as described.

8. The combination of the shaft A, the cutters $a$, the collars $e f$, and clamping-nut $k$, substantially as described.

FRANK N. ETHRIDGE.

Witnesses:
C. Y. ETHRIDGE,
C. B. TUTTLE.